Oct. 24, 1939.   E. H. WITTENBERG   2,177,123
PRESSURE COOKER
Filed April 25, 1938

INVENTOR
EDWARD H. WITTENBERG
BY Paul, Paul & Moore
ATTORNEYS

Patented Oct. 24, 1939

2,177,123

UNITED STATES PATENT OFFICE 2,177,123

PRESSURE COOKER

Edward H. Wittenberg, Eau Claire, Wis., assignor to National Pressure Cooker Company, Eau Claire, Wis., a corporation of Wisconsin Application April 25, 1938, Serial No. 204,067

4 Claims. (Cl. 220—40)

This invention relates to new and useful improvements in pressure cookers and more particularly to a novel means for securing the cover in position upon the cooker body.

It is highly desirable in devices of this general character, that means be provided whereby the cover cannot accidentally be blown off the cooker, when the cover securing means is released while the cooker is under pressure. Various devices have been developed for this purpose, but most of these are quite expensive and complicated.

It is therefore an object of the present invention to provide, in combination with the cover securing means, a simple and inexpensive device which requires that the cover be moved out of engagement with its seat before it can be bodily removed from the cooker body, whereby the danger of the cover accidentally being blown off the cooker, when its securing means is released while the cooker is under pressure, is positively eliminated.

A further and more specific object is to provide in the cooker body, a plurality of inwardly facing recesses, each provided with a horizontal wall adapted to be engaged by projections or pins provided upon the cover, thereby to prevent the cover from engaging the seat in the cooker body until it has been rotated to a predetermined position thereon, and whereby the cover must be lifted out of engagement with its seat and rotated to a predetermined position, before it can be bodily removed from the cooker body.

Other objects of the invention reside in the unique construction of the means for preventing the cover from being blown off the cooker, when its securing means is released; in the provision of a plurality of bayonet slots in the upper wall portion of the cooker body, each having a horizontal wall, which walls terminate at one end with a suitable depression adapted to receive a plurality of projections provided on the cover, and a downwardly facing horizontal wall being provided over each depression adapted to be engaged by the projections on the cover, in the event that the cover is released and is forced upwardly by pressure within the cooker.

Other objects of the invention will appear from the following description and accompanying drawing and will be pointed out in the annexed claims.

In the accompanying drawing there has been disclosed a structure designed to carry out the various objects of the invention, but it is to be understood that the invention is not confined to the exact features shown as various changes may be made within the scope of the claims which follow.

Figure 1:
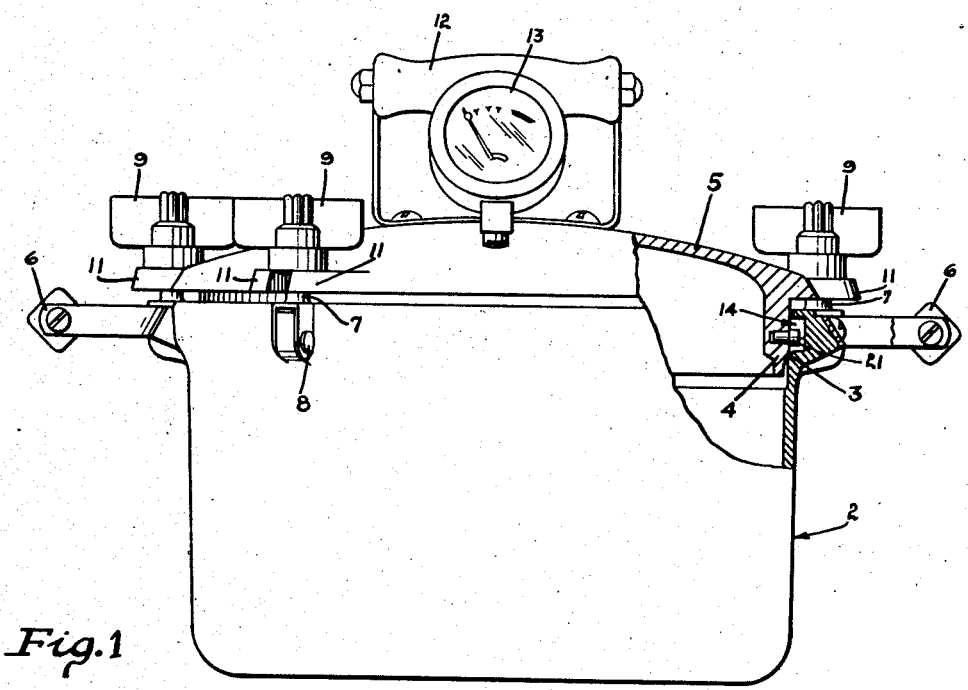
Figure 1 is a view of a pressure cooker, partially in section, showing the invention embodied in the construction thereof.

In the selected embodiment of the invention here shown, there is illustrated in Figure 1, for purposes of disclosure, a pressure cooker comprising a body 2 having a seat 3 adjacent its upper end adapted to be engaged by the depending flange 4 of a suitable cover 5.

The cooker body 2 is shown provided with suitable handles 6, and also has a plurality of threaded studs 7 pivotally mounted thereon by suitable pivots 8. Each stud is provided with a suitable thumb screw or wing nut 9. The cover 5 is shown provided with a plurality of forked lugs 11 adapted to receive the studs 7, whereby when the wing nuts 9 are relatively rotated in one direction, the cover is secured to the cooker body. The cover is also shown having a suitable handle 12 and a pressure gauge 13, as is customary in devices of this type. It is also provided with a safety valve, not shown.

An important feature of the present invention resides in the novel means provided for preventing the cover from being blown off the cooker body, should the thumb screws or wing nuts 9 accidentally be operated to release the cover, when the cooker is under pressure.

The means provided for thus preventing the cover from being accidentally blown off the cooker body is shown comprising a plurality of suitable recesses, generally indicated by the numeral 14. These recesses are provided in the upper wall portion 19 of the cooker body, and face inwardly as clearly illustrated in Figures 2 and 3. Each recess has an upwardly facing horizontal wall portion 15, terminating at one end in a depression 16. A downwardly facing horizontal wall portion 17 is provided over each depression 16 and has its end portion 18 spaced from the vertical wall 19 of the recess 14, as clearly illustrated in Figures 4 and 5. The upper horizontal wall portion 17 overhangs a portion of the lower horizontal wall 15.

A plurality of suitable projections or studs, generally indicated by the numeral 21, are provided in the periphery of the depending flange 4 of the cover 5. These studs are adapted to be received in the recesses 14 between the vertical wall portions 18 and 19.

When the cover is initially placed on the cooker body, the studs 21 of the cover will engage the horizontal walls 15 of the recesses 14. Such engagement of the studs 21 with the walls 15 will prevent the cover from sealingly engaging the seat 3 of the cooker body, whereby an annular gap 20 is provided between the seat 3 and flange 4 of the cover.

Before the cover can be moved into engagement with the seat 3, the cover must be rotated to bring the forked lugs 11 into registration with the studs 7. When this is done, the projections or studs 21 on the cover will drop into the depression 16 of the recesses 14, and thereby permit the cover to move into sealing engagement with the seat 3. The securing bolts or elements 7 are then swung upwardly into engagement with the forked lugs 11 and the wing nuts 9 rotated to force the cover into air tight engagement with the seat 3.

Figure 4:
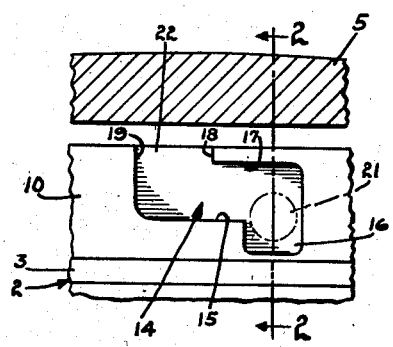
Figure 4 is a detail sectional view on the line 4—4 of Figure 2.

When the cover is thus secured in sealing engagement with the seat 3, the projections or studs 21 of the cover will be positioned beneath the horizontal walls 17, as best shown in Figure 4. When the studs 21 are thus positioned, it will readily be noted that, should the wing nuts 9 be operated to release the cover while the cooker is under pressure, the cover cannot be blown off the cooker body, as a result of the studs 21 engaging the over-hanging horizontal wall portions 17 of the recesses 14.

Figure 5:
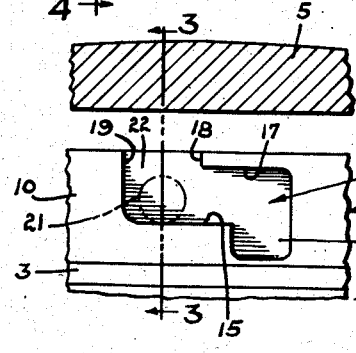
Figure 5 is a similar detail sectional view on the line 5—5 of Figure 3.

It will further be noted, by reference to Figures 4 and 5, that before the cover can be bodily removed from the cooker body, it must be rotated to bring the studs 21 into registration with the receiving ends 22 of the recesses 14, as shown in dotted lines in Figure 5, which will permit the pressure within the cooker body to escape to the atmosphere before the cover can be bodily removed from the cooker body.

The above described structure is very simple and inexpensive in construction and positively prevents the cover from accidentally being blown off the cooker body, when the wing nuts 9 are actuated to release the cover, as hereinbefore described.

Figure 2:
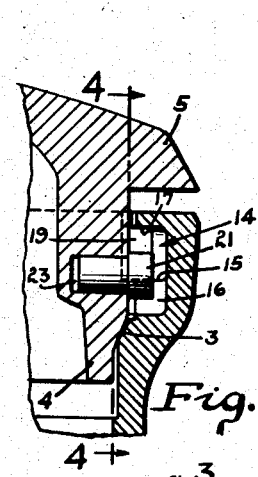
Figure 2 is an enlarged detail sectional view on the line 2—2 of Figure 4, showing the cover in sealing engagement with its seat.
Figure 3:
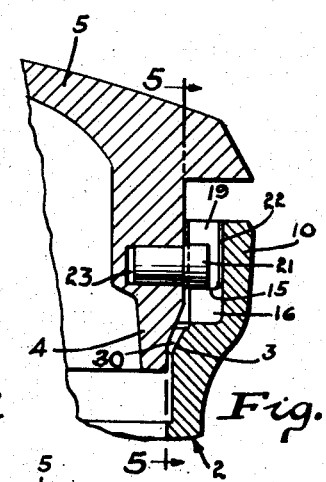
Figure 3 is a detail sectional view on the line 3—3 of Figure 5, showing the cover spaced from the seat.

In Figures 1, 2, and 3, I have shown the studs 21 of the cover 5 as being shouldered and secured in suitable sockets or apertures 23, provided in the flange 4 of the cover. It is to be understood that these studs may be otherwise secured to the cover without departing from the scope of the invention.

I claim as my invention:

1. In a pressure cooker, a body having a seat therein, a cover adapted to sealingly engage said seat, said body having in its upper portion a plurality of Z-shaped slots, each provided with a horizontal wall terminating in an offset portion, projections on the cover adapted to be received in said slots, when the cover is placed on the cooker body, said horizontal walls being so positioned with respect to said seat as to intercept said projections and prevent the cover from sealingly engaging said seat until it has been rotated to bring said projections into said offset portions, and means adjacent said offset portions adapted to intercept said projections upon the unseating of said cover, to prevent the latter from being blown off.

2. In a pressure cooker, a body having a seat therein, a cover adapted to sealingly engage said seat, cover securing means, said body having a plurality of recesses in its upper marginal wall each provided with a lower horizontal wall portion, which wall portions terminate at one end with a depression, projections on the cover adapted to be received in said recesses, said lower wall portions being positioned to be engaged by said projections, when the cover is initially placed on the cooker body, whereby the cover cannot engage said seat until relatively rotated on the cooker body to move said projections into registration with said depressions, and said recesses having wall portions disposed above said depressions whereby the cover cannot be blown from the cooker, when the cover securing means is actuated to release the cover while the cooker is under pressure.

3. A pressure cooker comprising two members, one serving as the body of the cooker and the other as the cover, the body member having a seat adapted to be engaged by the cover member, a plurality of recesses in one of said members each provided with a substantially horizontal wall portion terminating in an offset portion, a plurality of projections on the other member each adapted to be received in one of said recesses, when said members are secured together in operative relation, said projections and horizontal wall portions preventing the cover member from sealingly engaging said seat until the cover member has been rotated to bring said projections adjacent said offset portion, means for securing the cover in fixed position on the body member, and means cooperating with said projections to prevent the cover from accidentally being blown off the cooker, if the cover is inadvertently released before the pressure has been released from the cooker.

4. A pressure cooker comprising a receptacle open at the top, a cover for said receptacle, sealing members on said receptacle and cover adapted to effect a seal between said receptacle and cover when the cover is urged toward the receptacle and the sealing members are engaged and to break the seal when the cover is moved away from the receptacle, and the sealing members disengaged, said receptacle and cover having juxtaposed parts, an abutment on one of said parts, and a finger on the other of said parts adapted to engage the abutment and to restrain movement of the cover away from the receptacle, said abutment and finger being spaced apart when the sealing members are in engagement a distance sufficient to cause said sealing members to become free from one another when said finger is in engagement with said abutment.

EDWARD H. WITTENBERG.